US011477436B2

United States Patent
Galpin et al.

(10) Patent No.: US 11,477,436 B2
(45) Date of Patent: Oct. 18, 2022

(54) METHOD AND APPARATUS FOR COMBINED INTRA PREDICTION MODES

(71) Applicant: INTERDIGITAL VC HOLDINGS, INC., Wilmington, DE (US)

(72) Inventors: Franck Galpin, Cesson-Sevigne (FR); Fabien Racape, San Francisco, CA (US); Philippe Bordes, Laille (FR); Fabrice Urban, Thorigne Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/049,724

(22) PCT Filed: Apr. 3, 2019

(86) PCT No.: PCT/US2019/025479
§ 371 (c)(1),
(2) Date: Oct. 22, 2020

(87) PCT Pub. No.: WO2019/209477
PCT Pub. Date: Oct. 31, 2019

(65) Prior Publication Data
US 2021/0243430 A1    Aug. 5, 2021

(30) Foreign Application Priority Data

Apr. 27, 2018   (EP) .................................... 18305528

(51) Int. Cl.
*H04N 19/105*   (2014.01)
*H04N 19/159*   (2014.01)
(Continued)

(52) U.S. Cl.
CPC ......... *H04N 19/105* (2014.11); *H04N 19/159* (2014.11); *H04N 19/176* (2014.11); *H04N 19/70* (2014.11)

(58) Field of Classification Search
CPC .................................................... H04N 19/105
See application file for complete search history.

(56) References Cited

U.S. PATENT DOCUMENTS

| | | | |
|---|---|---|---|
| 10,939,096 B2 * | 3/2021 | Xiu | H04N 19/182 |
| 11,082,703 B2 * | 8/2021 | Seregin | H04N 9/8045 |

(Continued)

FOREIGN PATENT DOCUMENTS

| | | |
|---|---|---|
| CN | 103636203 | 3/2014 |
| EP | 2391130 | 11/2011 |
| WO | WO2018026148 | 2/2018 |

OTHER PUBLICATIONS

Seregin et al., "Neighbor based intra most probable modes list derivation" Joint Video Exploration Team (JVET) of ITU-T SG 16 WP 3 and ISO/IEC JTC 1/SC 29/WG 11, Document: JVET-C0055, 3rd Meeting: Geneva, CH, 26 May-Jun. 1, 2016.Geneva, CH, 2016.

(Continued)

*Primary Examiner* — Irfan Habib
(74) *Attorney, Agent, or Firm* — Ronald Kolczynski (57) ABSTRACT

Encoders and decoders of digital video signals use combined intra prediction modes for some images. In at least one embodiment, combined intra prediction modes can result from the intra prediction modes of neighboring blocks. The combined intra prediction mode can be added to a most probable modes list. Various embodiments describe techniques for combining the intra prediction modes, comprising a combination of reference samples and a combination of directions to form a prediction. Another embodiment adds a combination mode to the most probable modes list if the two modes that are combined to form it are directional modes (Continued)

with angle difference less than 90 degrees. Another embodiment uses a linear combination of intra prediction modes and another embodiment performs a linear combination which depends on the distance of a prediction from the left and above blocs.

24 Claims, 12 Drawing Sheets

(51) Int. Cl.
*H04N 19/176* (2014.01)
*H04N 19/70* (2014.01)

(56) References Cited

U.S. PATENT DOCUMENTS

| | | | |
|---|---|---|---|
| 11,290,730 B2* | 3/2022 | Bordes | H04N 19/176 |
| 2011/0249745 A1* | 10/2011 | Chen | H04N 19/105 |
| | | | 375/E7.125 |
| 2011/0317757 A1* | 12/2011 | Coban | H04N 19/96 |
| | | | 375/E7.126 |
| 2012/0275717 A1* | 11/2012 | Ueda | H04N 19/46 |
| | | | 382/236 |
| 2014/0016874 A1 | 1/2014 | Francois et al. | |
| 2017/0272745 A1* | 9/2017 | Liu | H04N 19/157 |
| 2017/0353719 A1 | 12/2017 | Liu et al. | |
| 2019/0166375 A1* | 5/2019 | Jun | H04N 19/13 |
| 2019/0222837 A1* | 7/2019 | Lee | H04N 19/44 |
| 2019/0373287 A1* | 12/2019 | Lim | H04N 19/119 |
| 2019/0379901 A1* | 12/2019 | Chiang | H04N 19/52 |
| 2020/0195935 A1* | 6/2020 | Seregin | H04N 19/159 |
| 2020/0322601 A1* | 10/2020 | Ko | H04N 19/593 |
| 2021/0144369 A1* | 5/2021 | Kotra | H04N 19/70 |
| 2021/0185326 A1* | 6/2021 | Wang | H04N 19/105 |
| 2021/0211716 A1* | 7/2021 | Zhang | H04N 19/159 |

OTHER PUBLICATIONS

Series H: Audiovisual and Multimedia Systems Infrastructure of Audiovisual Services—Coding of Moving Video, High Efficiency Video Coding, ITU-T Telecommunication Standardization Sector of ITU H.265 (Oct. 2014).
Said et al., Position Dependent Prediction Combination for Intra-Frame Video Coding, 2016 IEEE, pp. 534-538.
Tseng et al., Fast Coding Unit Decision and Mode Selection for Intra-Frame Coding in High-Efficiency Video Coding, IET Image Process, (2016), vol. 10, Iss. 3, pp. 215-221.
Ye, et al.. Improved H.264 Intra Coding Based on Bi-Directional Intra Prediction, Directional Transform, and Adaptive Coefficient Scanning, 15th IEEE International Conference on Image Processing, ICIP 2008, San Diego, California, Oct. 12-15, 2008, IEEE, Piscataway, NJ, Oct. 12, 2008, pp. 2116-2119.
Shiodera et al., CE6 Subset A: Bidirectional Intra Prediction, 4. JCT-VC Meeting, 95, MPEG Meeting, Jan. 20-Jan. 28, 2011, Daegu, (Joint Collaborative Team on Video Coding of ISO/IEC JTC1/SC29/WG11 and ITU-T SG.16), URL:HTTP://WFTP3.ITU.INT/AV-ARCH/JCTVC-SITE/, No. JCTVC-D108, Jan. 15, 2011.
Series H: Audiovisual and Multimedia Systems Infrastructure of Audiovisual Services—Coding of Moving Video, Advanced Video Coding for Generic Audiovisual Services, ITU-T Telecommunication Standardization Sector of ITU, H.264, (Feb. 2014).
Algorithm Description of Joint Exploration Test Model 7 (JEM7), 119. MPEG Meeting. Jul. 7-Jul. 21, 2017, Torino, (Motion Picture Expert Group or ISO/IEC JTC1/SC29/WG11), No. N17055, Oct. 6, 2017.

* cited by examiner

METHOD AND APPARATUS FOR COMBINED INTRA PREDICTION MODES

FIELD OF THE INVENTION

The present principles relate to video compression and video encoding and decoding.

BACKGROUND OF THE INVENTION

The domain of the following embodiments is video coding, focused on a robust way of intra encoding and decoding with a wider variety of prediction modes than in present encoders and decoders. To predict the border of a curvy object for example, existing encoders would have to choose small blocks along an edge of this object to predict it in a piecewise manner.

The JVET (Joint Video Exploration Team) is exploring an improved video coding standard, known as H.266, Versatile Video Coding (VVC) or known as H.266/VCC. In JVET or H.266/VCC, filters have been proposed to smooth the intra predictors. For instance, Position Dependent Prediction Combination, combines predicted values using smoothed and non-filtered reference samples. This enables a filtering of the prediction that originally corresponds to a directional padding of possibly smoothed reference samples. However, this approach has limitations and can require additional parameters to be transmitted, thereby reducing its advantages.

The described embodiments propose to use such intra prediction using combined modes in an encoder or decoder.

SUMMARY OF THE INVENTION

These and other drawbacks and disadvantages of the prior art are addressed by the present principles, which are directed to a method and apparatus for combined intra mode prediction.

According to an aspect of the present principles, there is provided a method. The method comprises steps of: predicting a current video block based on a combination of intra prediction modes from video blocks neighboring the current video block; and encoding the current video block using said prediction, wherein said combination of intra prediction modes is added to a list of most probable modes used during encoding.

According to another aspect of the present principles, there is provided a second method. The method comprises steps of: predicting a current video block based on a combination of intra prediction modes from video blocks neighboring the current video block; and decoding the current video block using said prediction, wherein said combination of intra prediction modes is added to a list of most probable modes used during decoding.

According to another aspect of the present principles, there is provided an apparatus. The apparatus comprises a memory and a processor. The processor can be configured to encode or decode a block of a video image by predicting a current video block based on a combination of intra prediction modes from video blocks neighboring the current video block; and encoding/decode the current video block using said prediction, wherein said combination of intra prediction modes is added to a list of most probable modes used during encoding/decoding.

These and other aspects, features and advantages of the present principles will become apparent from the following detailed description of exemplary embodiments, which is to be read in connection with the accompanying drawings.

DETAILED DESCRIPTION

This invention is incorporated within the framework of compression of videos, specifically at the intra prediction stage. Existing hybrid codecs, e.g. H.264/MPEG4-AVC and H.265/HEVC use intra prediction that aims at encoding a current block by first building a prediction using previously reconstructed neighboring samples in the same image and then encode the difference between the prediction and the source, also called residual. In the exemplary reference Joint Exploration Model (JEM) under study by the Joint Video Exploration Team (JVET), 67 intra prediction modes can be selected by the encoder.

The planar mode creates a smooth linear combination of the reference samples over the current block.

The DC mode assigns the mean value of reference samples to all the samples in the current block.

The 65 remaining directional modes propagate the reference samples onto the current block along specific directions.

The syntax element coding the mode index can then represent a prohibitive cost. The Most Probable Modes (MPM) method enables reduction of the cost of this information by giving a lighter syntax to modes which are statistically often used and reusing the modes chosen for already reconstructed neighbors. If the MPM is selected, an index is transmitted among the short list of MPM. Several neighboring blocks are then considered and one best mode is selected.

In one embodiment described herein, when at least two neighboring blocks are available, it is proposed to add an intra mode to the MPM list, which is a combination of these neighboring blocks' prediction modes. For example, when two neighboring blocks were coded with different directional modes, it is proposed to create a hybrid mode that is a linear mapping of the directions over the surface of the current block.

The problem solved by these embodiments is to improve the intra prediction efficiency for blocks whose causal neighbors bring complementary information, by adding an extra mode which is a combination of those neighbor prediction modes.

This invention aims at enabling a new padding of reference samples onto a current block to build an intra prediction. Existing directional modes consist in propagating reference samples with a fixed direction.

Then, to predict the border of a curvy object for example, existing encoders would have to choose small blocks along an edge of this object to predict it in a piecewise manner.

In JVET, filters have been proposed to smooth the intra predictors. For instance, Position Dependent Prediction Combination, combines predicted values using smoothed and non-filtered reference samples. This enables to filter the prediction that originally corresponds to a directional padding of possibly smoothed reference samples. However, this algorithm does not combine two modes that could be considered on the same block surface.

In another approach, a parametric modification of straight directional modes is proposed to better align the prediction with the current block's content. However, extra parameters must be transmitted to signal the prediction process to the decoder. For small or low textured blocks, the residuals can be compact and well compressed through transform and entropy coding. But the syntax to code the prediction mode is not negligible and these extra parameters become prohibitive. In the proposed solution, little or no additional syntax is needed.

To better predict various spatial directions of objects and textures, at least one of the described embodiments proposes to add an extra mode in the context of the Most Probable Mode (MPM) framework. The new mode can be signaled as an additional mode of the list of most probable modes used during encoding.

When two reconstructed neighboring blocks are available and use different prediction modes, one embodiment uses a model that combines the two prediction directional modes over the current block's surface and considers the varying ways the neighbors were encoded.

As a first example, but not limited to this case, consider a block on the left and on the top of the current block that were coded using different directional modes. Then a model is chosen to make the direction vary over the current block's surface, depending on the neighboring directions and the location of the considered neighbors.

Adding extra modes to the already existing list of 67 would represent a prohibitive syntax cost. Advantageously, this mode corresponds to an extra mode that can be added only when neighboring modes exist. It can be added as an extra MPM, without extending the complete list of intra modes and their corresponding syntax.

The description of at least one presented solution is based on the exemplary current version of the reference software designed by the joint Video Exploration Team (JVET) to design the next MPEG/ITU standard for video coding, currently known as H.266. The invention is however not limited to this potential version of H.266 and can apply to any future video standards including block-wise intra prediction.

In existing codecs, the building of an intra prediction uses extremely basic operations. The efficiency of the process lies in the multitude of modes that can be selected by the encoder. However, the syntax elements coding this decision can become costly. For example, in the JVET exploratory software, 67 intra modes are considered to predict each block of the luma component.

The planar mode creates a smooth linear combination of the reference samples over the current block.

The DC mode assigns the mean value of reference samples to all the samples in the current block.

The 65 remaining directional modes propagate the reference samples onto the current block along specific directions.

Therefore, Most Probable Modes (MPM) have been introduced to predict the intra prediction mode from already decoded information.

Figure 1:
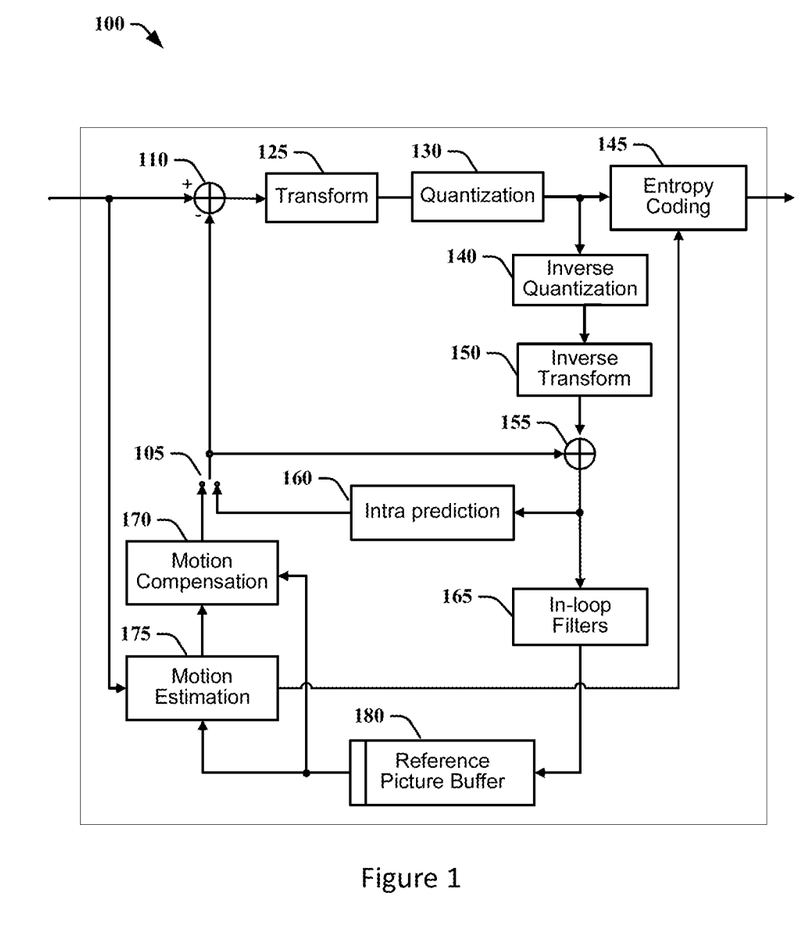
FIG. 1 shows a standard, generic video compression scheme to which the described embodiments can be applied.
Figure 2:
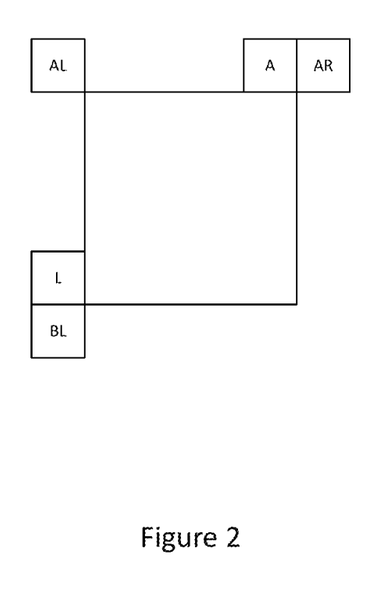
FIG. 2 shows example intra modes from neighboring video blocks.

In JEM, the coding of the intra mode index is performed via an improved version of the Most Probable Modes of HEVC. The current method is based on another algorithm. For a current block, 5 neighboring locations are considered, i.e., left (L), above (A), below left (BL), above right (AR), and above left (AL) as shown in FIG. 2.

The modes to be added are checked in the following order:

L, A, Planar, DC, BL, AR, AL.

For each entry of the current list: if the mode is directional: add mode−1 then mode+1 (That is, first add a neighboring block's mode. If there is room in the list add the modes with indices around the neighboring block's mode, since a neighboring block could share a similar structure with a slightly different angle.)

Add remaining default modes: VER, HOR, 2, DIA

Figure 3:
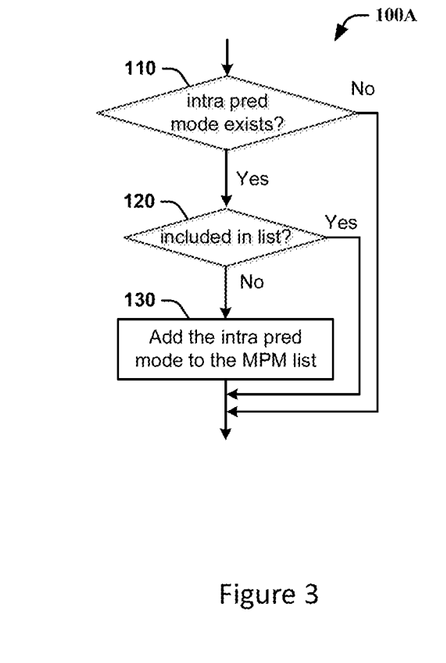
FIG. 3 shows one embodiment of adding a mode to a Most Probable Mode (MPM) list

If the modes to be added exist (dirMode>0 and dirMode<65) and are not already included in the list, they are added at the current last position (pushed back), as described in FIG. 3. First, the existence of the mode to be added is checked by 110. If the neighboring block does not exist or is not intra coded, the list is unchanged. Otherwise, module 120 checks if the mode is already included in the current list. If not, it is included in the list at the last position by module 130, otherwise, the list remains unchanged.

Figure 4:
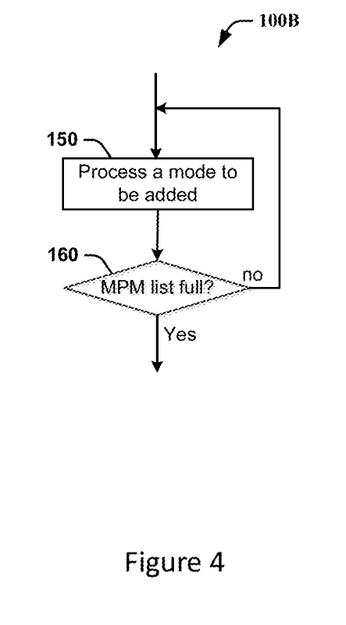
FIG. 4 shows construction of a Most Probable Mode list in the JEM (Joint Exploration Model).

The process described in FIG. 3 corresponds to the box 150 in FIG. 4, which describes the overall process of the construction of the MPM list. As described in FIG. 4, the potential modes are added until the list of MPMs is full (160).

If the best mode belongs to this list, the syntax for coding is very small. The encoder just needs to send a flag informing the decoder that the mode belongs to the MPM list. Then, the MPM index, coded using truncated unary code is very light. Especially for small blocks and in general for blocks with few residuals, i.e. when the syntax cost is not negligible compared to transformed coefficients, this encourages the encoder to select those modes since their cost in terms of syntax is low.

In existing codecs, intra prediction aims at constructing a first version of the current block, called a predictor, which minimizes the energy of the residual signal to be transmitted in the bitstream. The residuals are often transformed in frequency domain then quantized and encoded. Hence, the goal is not to provide a visually satisfying predictor but a construction using available samples that optimizes the cost of transmitted data. In the case of a block located at the border of an object or over curvy textures, for example, the encoder has the following options:

Use a best matching directional mode.

Use DC or Planar.

When possible, split the block so that smaller sub-blocks are better predicted, at the cost of more syntax elements.

Figure 5:
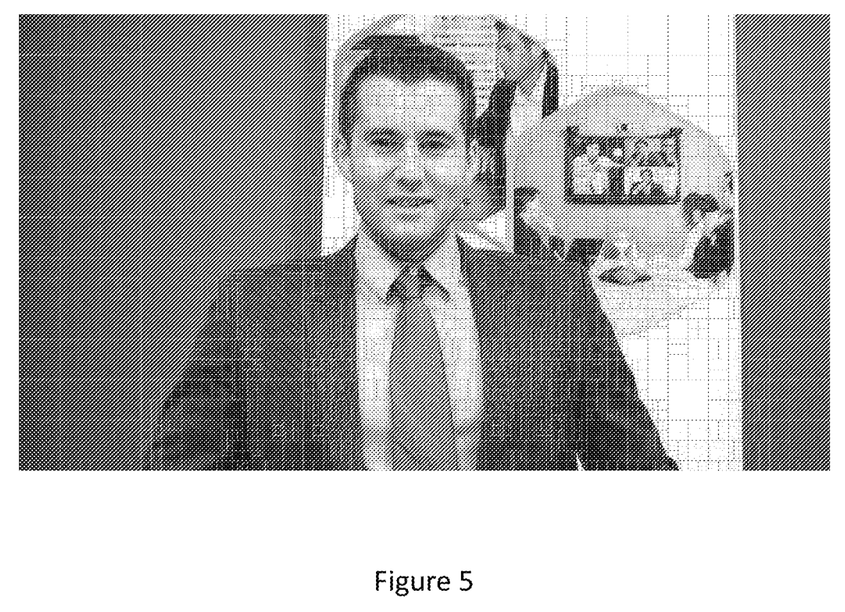
FIG. 5 shows an example of partitioning for an intra coded frame with a candidate codec for H.266.

For example, a curvy border of an object will make the encoder choose small blocks along the edge, so that straight directional modes can approximate the shape. Textures and edges are mostly encoded with small blocks, except for some straight edges. For example, in FIG. 5, edges of the character are coded with small blocks because they are not efficiently predicted with existing modes. It can be noticed on the jacket that a couple of bigger blocks appear due to straight patterns that are well predicted with straight directional modes. However, this rarely happens in natural videos.

From the above sections, it can be asserted that curvy edges and textures are not easily predictable with existing intra modes. Adding "curvy" padding modes would extend the number of intra modes, thus syntax, and the combinatory at encoder and decoder sides, resulting in higher complexity. On the other hand, MPM offers a way to combine neighboring modes with reduced syntax. Depending on the embodiment, an MPM list can contain the combined mode or two modes contained in the MPM can be combined.

It is then proposed to add intra modes which correspond to a combination of neighboring blocks' modes when they are different.

Figure 6:
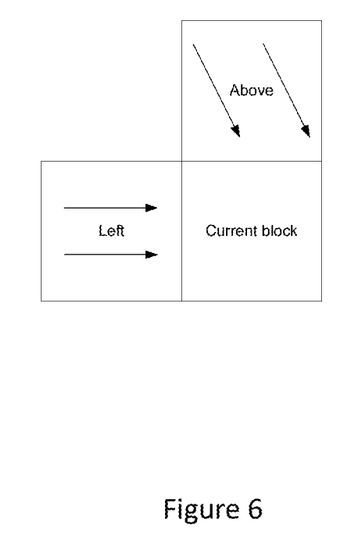
FIG. 6 shows an example of a current block whose neighbors were encoded using directional prediction modes.

Take, for example, a block whose Left and Top neighbors were predicted with different directional modes, as depicted in FIG. 6.

Figure 7:
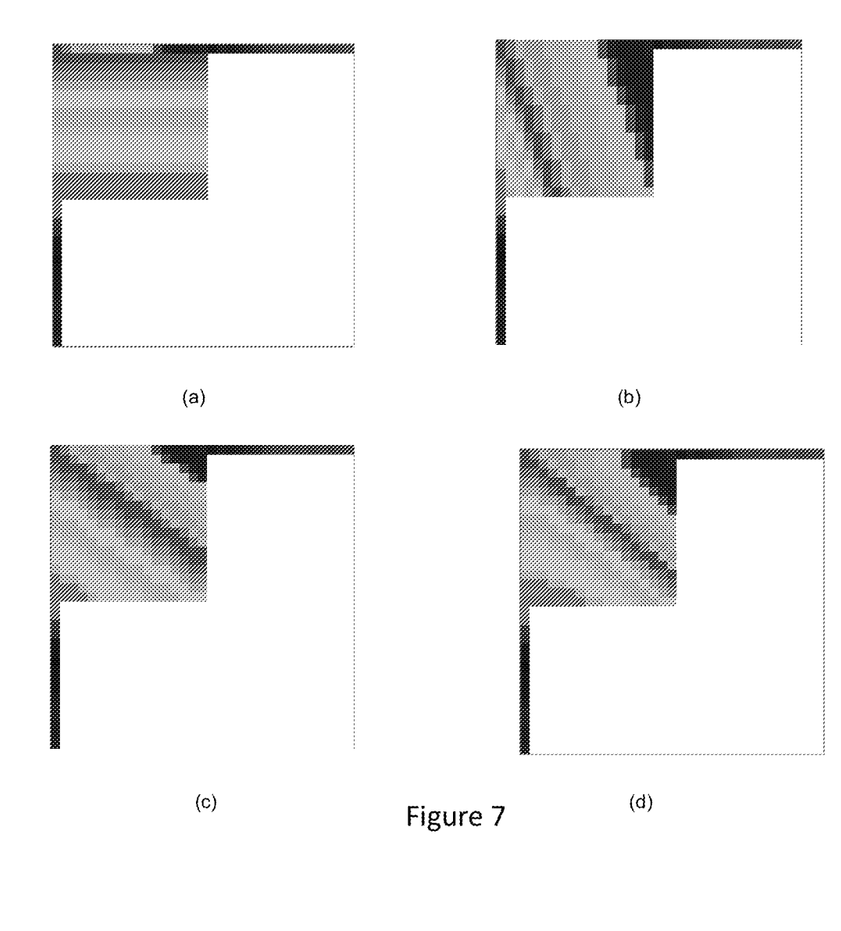
FIG. 7 shows intra mode predictors using (a) the mode of the left block, (b) the mode of the above mode, (c) the direction corresponding to the average of left and above, (d) a proposed position dependent combination.
Figure 8:
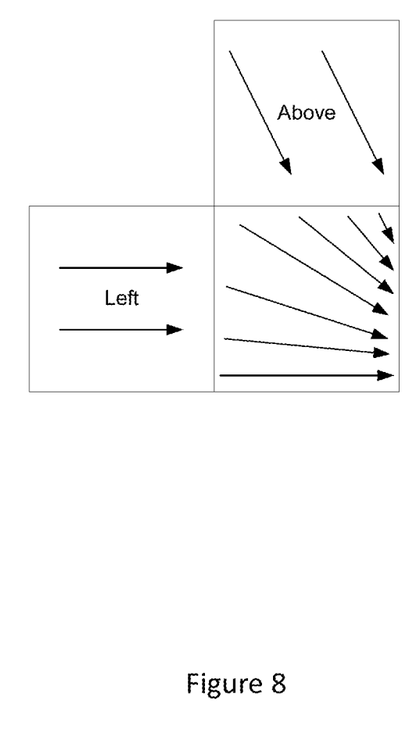
FIG. 8 shows an example of interpolated directions over a current block to predict.

FIG. 7 depicts exemplary propagations related to the intra mode directions shown in FIG. 6. FIGS. 7(a) and (b) correspond to the intra predictor when using the mode chosen for the left, and above, block, respectively. FIG. 7(c) shows what would happen if using a directional mode corresponding to the average of the left and above block's modes. Finally FIG. 7(d) shows an exemplary result of the proposed combination. In this example, the combination (model) is computed as:

$$\theta(x, y) = \frac{y \cdot \theta_L + x \cdot \theta_A}{x + y}$$

where $\theta(x,y)$ represents the angle of the direction for each pixel location, x and y represent the horizontal and vertical coordinates respectively, and $\theta_L$ and $\theta_A$ represent the Left and Above directional modes, respectively. For illustration purposes in FIG. 7, no smoothing filter has been used and no interpolation is performed when the directional mode padding points at locations in between reference samples, and the nearest reference sample's value is chosen. The sample values correspond to the resultant angle that applies to the pixels.

In the case of current codecs, the encoder can select one of them at a low syntax cost. Then, several embodiments, described below, consist in different ways to signal this combination. For example, a syntax element can describe how to combine two existing modes, at a low syntax cost.

In some embodiments, different models are described in which linear combinations of actual sample values are considered.

In a first embodiment for encoding a block of an image, use the intra prediction process that propagates neighboring samples and:
 Check among previously encoded/decoded blocks if at least two can be combined to build at least one new propagation of the reference samples
 Derive the intra predictor of the current block from the reference samples and this new mode
 Encode a syntax element that describes which neighboring blocks' intra modes are used and how.

In a second embodiment, a decoder for decoding a block of an image, uses an intra prediction process that propagates neighboring samples and:
 Decodes a syntax element that describes which neighboring blocks' intra modes are used and how.
 Derives the intra predictor of the current block from the reference samples and the described mode.
 During intra prediction, this embodiment checks among the neighboring Left and Above modes. If the modes are different, add at least one mode to the list which corresponds to a combination of the two.

In at least a third embodiment for encoding, or decoding, a block of an image, using embodiment 1, or 2, respectively, where each new mode is a combination of modes included in the MPM list. The required syntax elements then describe the MPM list index of modes that are used.

In at least a fourth embodiment, and one in which no extra syntax is required, a new combination mode is added to the MPM list. During the MPM list construction process, neighboring modes are checked and when the combination is possible, the mode is added to the list.

In at least a fifth embodiment, the fourth embodiment can be implemented with at least one new mode added only for certain modes corresponding to Left and Above blocks (see FIG. 2). It can be included at any location in the MPM list, for instance after Left and Above modes or after Planar and DC, the only constraint being that an encoder and decoder share the same construction process.

In at least a sixth embodiment, the previous five embodiments can also include the process of adding a new mode that depends on the considered neighbor intra modes. It is for instance performed when the modes are directional and the angle difference is less than 90°.

In at least a seventh embodiment, the previous six embodiments can also include the at least one new mode being a linear combination of the values of the samples when predicted with the different modes.

For each p(i,j) in the current block, (i,j) being the coordinates within the block, (i=0,j=0) at the top left sample, $$p(i,j) = \alpha \cdot p_L(i,j) + (1-\alpha) p_A(i,j),$$

where $p_L(i,j)$ and $p_A(i,j)$ correspond to the prediction of the location (i,j) with the Left and Above modes, respectively.

In at least an eighth embodiment, the fifth embodiment can be used with the combination being linear and depending on the horizontal, or vertical distance, of the Left, or Above, respective block.

$$p(i, j) = \frac{(S_v - i + 1)}{S_v} * p_A(i, j) + \frac{(S_h - j + 1)}{S_h} * p_L(i, j)$$

In at least a ninth embodiment, the fifth embodiment is used with the combination being a combination in terms of direction, not pixel values. In this embodiment, the directions of the modes are combined. For each pixel of a current block, a combined direction is determined, not a combination of reference samples. For example, angular directions can be linearly interpolated from the top right to the bottom left location. Then, for each location in the current block, there is a single interpolated direction.

$$\theta(x, y) = \frac{y \cdot \theta_L + x \cdot \theta_A}{x + y}$$

Figure 9:
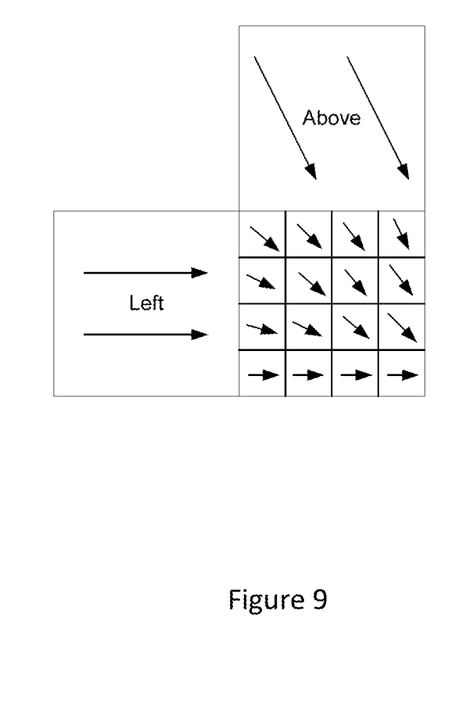
FIG. 9 shows an example of angular mode interpolation based on a grid of sub-blocks.

In at least a tenth embodiment, the eighth embodiment can be implemented where the change of direction is applied at a sub-block level, as depicted in FIG. 9. Each sub-block is classically predicted using a given directional mode. The center of each sub-block can be considered for computing its angular mode. In HEVC and in the JVET exploration software, 4×4 sub-blocks are considered for inter prediction. Sub-blocks of any size can also be considered for intra prediction under the described embodiments.

Figure 10:
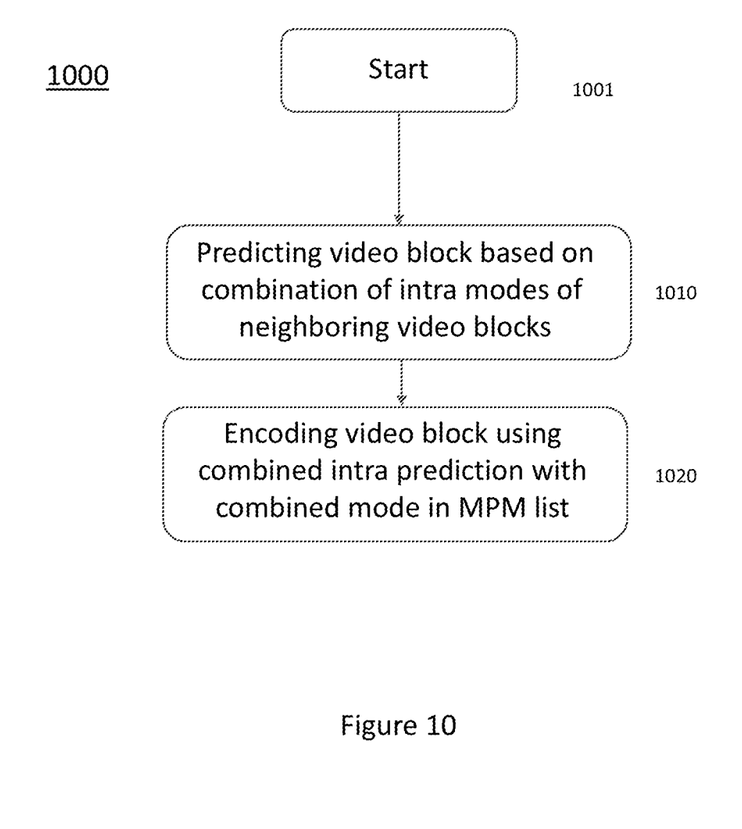
FIG. 10 shows one embodiment of a method using the described aspects.

One embodiment of the described aspects is illustrated in FIG. 10, which shows a method 1000 for encoding a video block using combined intra prediction modes. The method commences at Start block 1001 and control proceeds to block 1010 for predicting a current video block based on a combination of intra prediction modes from video blocks neighboring the current video block. Control proceeds from block 1010 to block 1020 for encoding the current video block using said prediction, wherein said combination of intra prediction modes is added to a list of most probable modes used during encoding.

Figure 11:
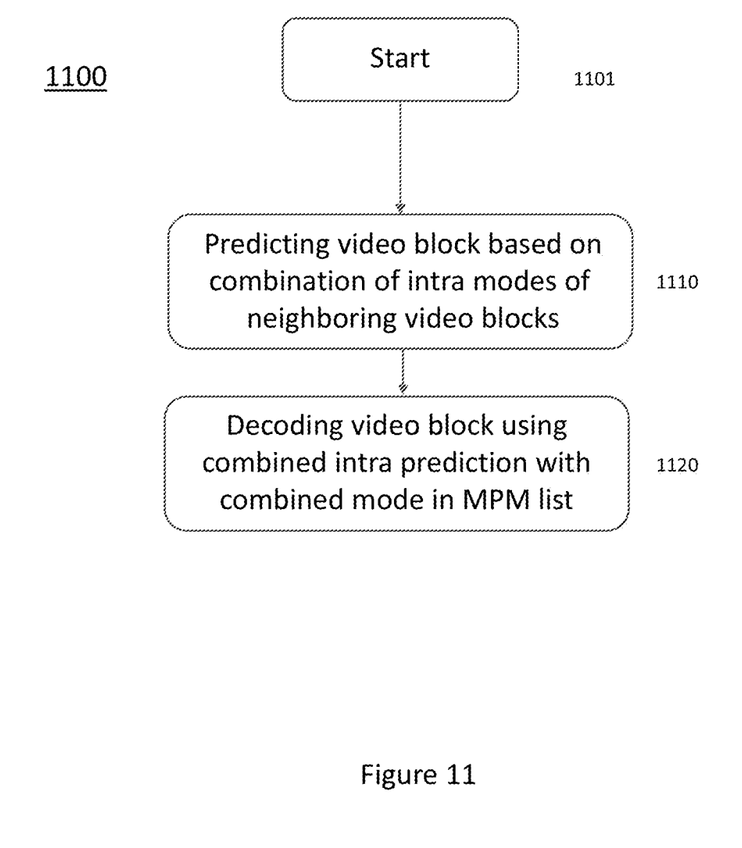
FIG. 11 shows another embodiment of a method using the described aspects.

Another embodiment of the described aspects is illustrated in FIG. 11, which shows a method 1100 for decoding a video block using combined intra prediction modes. The method commences at Start block 1101 and control proceeds to block 1110 for predicting a current video block based on a combination of intra prediction modes from video blocks neighboring the current video block. Control proceeds from block 1110 to block 1120 for decoding the current video block using said prediction, wherein said combination of intra prediction modes is added to a list of most probable modes used during decoding.

Figure 12:
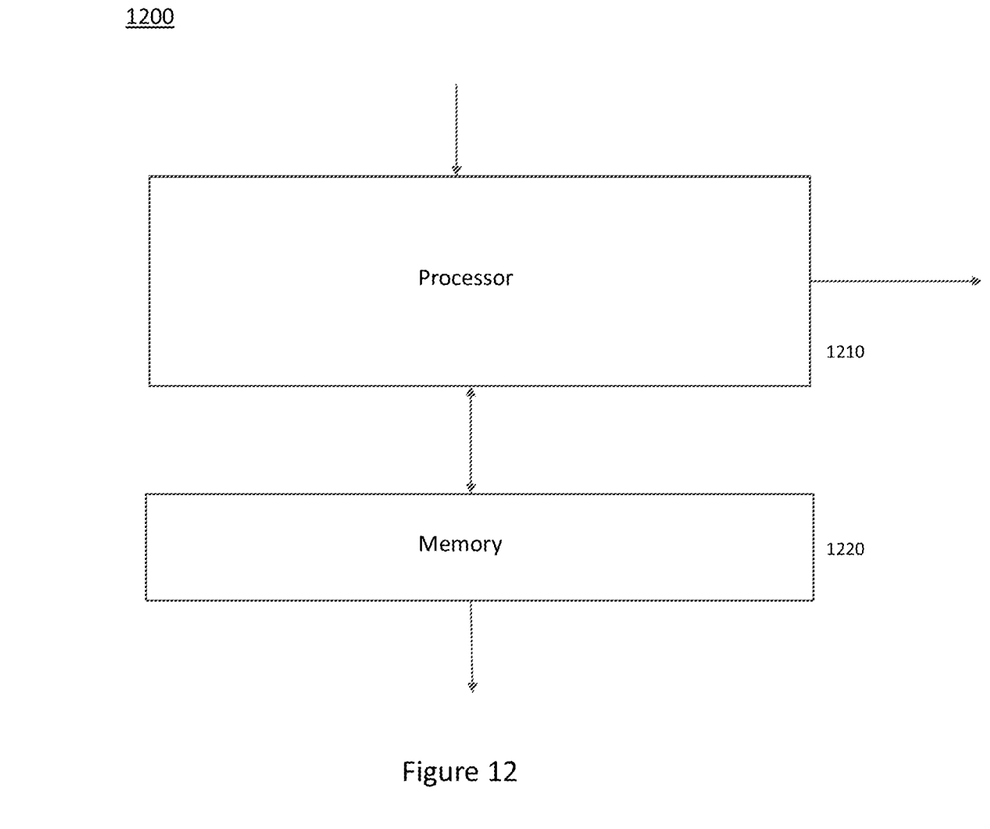
FIG. 12 shows one embodiment of an apparatus using the described aspects.

One embodiment of the described aspects is illustrated in FIG. 12, which shows an apparatus 1200 used for encoding or decoding a video block using combined intra prediction modes. The apparatus comprises a Processor 1210 and a Memory 1220. The Processor 1210 is configured, for encoding, to perform the steps of FIG. 10, that is performing encoding using combined intra prediction modes.

When Processor 1210 is configured for decoding, it performs the steps of FIG. 11, that is, performing decoding using combined intra prediction modes.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method, comprising:
   predicting a current video block based on a combination of intra prediction modes from video blocks neighboring the current video block; and
   encoding the current video block using said prediction, wherein said combination of intra prediction modes is added to a list of most probable modes used during encoding, wherein a new combination mode is added to the list of most probable modes when neighboring modes are checked and said new combination mode is possible and a syntax element indicates the video blocks neighboring the current video block whose modes are used and how they are used, wherein a mode is added to the list of most probable modes for a subset of possible combinations, wherein said subset comprises modes from a block to the left and above that of a current video block.

2. A non-transitory computer readable medium containing data content generated according to the method of claim 1, for playback using a processor.

3. The method of claim 1, wherein said combination of intra prediction modes is added to said list of most probable modes if the modes from said combination of intra prediction modes of video blocks neighboring the current block are different.

4. The method of claim 1, wherein a syntax element specifies use of a most probable modes list and wherein an index of most probable modes corresponds to a combination of intra prediction modes from video blocks neighboring the current video block.

5. The method of claim 1, wherein a combination of intra prediction modes is an additional mode in a list of most probable modes.

6. An apparatus for encoding a block of image data, comprising:

a memory, and a processor, configured to:

predict a current video block based on a combination of intra prediction modes from video blocks neighboring the current video block; and encode the current video block using said prediction, wherein said combination of intra prediction modes is added to a list of most probable modes used during encoding, wherein a new combination mode is added to the list of most probable modes when neighboring modes are checked and said new combination mode is possible and a syntax element indicates the video blocks neighboring the current video block whose modes are used and how they are used, wherein a mode is added to the list of most probable modes for a subset of possible combinations, wherein said subset comprises modes from a block to the left and above that of a current video block.

7. The apparatus of claim 6, wherein a syntax element specifies use of a most probable modes list and wherein an index of most probable modes corresponds to a combination of intra prediction modes from video blocks neighboring the current video block.

8. The apparatus of claim 6, wherein said combination of intra prediction modes is added to said list of most probable modes if the modes from said combination of intra prediction modes of video blocks neighboring the current block are different.

9. The apparatus of claim 6, wherein a syntax element specifies use of a most probable modes list and wherein an index of most probable modes corresponds to a combination of intra prediction modes from video blocks neighboring the current video block.

10. The apparatus of claim 6, wherein a combination of intra prediction modes is an additional mode in a list of most probable modes.

11. A method, comprising:

predicting a current video block based on a combination of intra prediction modes from video blocks neighboring the current video block; and decoding the current video block using said prediction, wherein said combination of intra prediction modes is added to a list of most probable modes used during decoding, wherein a new combination mode is added to the list of most probable modes when neighboring modes are checked and said new combination mode is possible and a syntax element indicates the video blocks neighboring the current video block whose modes are used and how they are used, wherein a mode is added to the list of most probable modes for a subset of possible combinations, wherein said subset comprises modes from a block to the left and above that of a current video block.

12. The method of claim 11, wherein said combination of intra prediction modes is added to said list of most probable modes if the modes from said combination of intra prediction modes of video blocks neighboring the current block are different.

13. The method of claim 11, wherein a syntax element specifies use of a most probable modes list and wherein an index of most probable modes corresponds to a combination of intra prediction modes from video blocks neighboring the current video block.

14. The method of claim 11, wherein a combination of intra prediction modes is an additional mode in a list of most probable modes.

15. The method of claim 11, wherein a combined mode is added to a list of most probable modes if it is based on directional intra modes with an angle difference of less than 90 degrees.

16. The method of claim 11, wherein said combination is a linear combination of sample values when predicted with different modes.

17. The method of claim 11, wherein said combination is formed based on direction.

18. A non-transitory computer program product comprising instructions which, when the program is executed by a computer, cause the computer to carry out the method of claim 11.

19. An apparatus for decoding a block of image data, comprising:

a memory, and a processor, configured to:

predict a current video block based on a combination of intra prediction modes from video blocks neighboring the current video block; and decode the current video block using said prediction, wherein said combination of intra prediction modes is added to a list of most probable modes used during decoding, wherein a new combination mode is added to the list of most probable modes when neighboring modes are checked and said new combination mode is possible and a syntax element indicates the video blocks neighboring the current video block whose modes are used and how they are used, wherein a mode is added to the list of most probable modes for a subset of possible combinations, wherein said subset comprises modes from a block to the left and above that of a current video block.

20. The apparatus of claim 19, wherein said combination of intra prediction modes is added to said list of most probable modes if the modes from said combination of intra prediction modes of video blocks neighboring the current block are different.

21. The apparatus of claim 19, wherein a combination of intra prediction modes is an additional mode in a list of most probable modes.

22. The apparatus of claim 19, wherein a syntax element specifies use of a most probable modes list and wherein an index of most probable modes corresponds to a combination of intra prediction modes from video blocks neighboring the current video block.

23. A method, comprising:
   predicting a current video block based on a combination of intra prediction modes from video blocks neighboring the current video block; and
   decoding the current video block using said prediction, wherein said combination of intra prediction modes is added to a list of most probable modes used during decoding, wherein a new combination mode is added to the list of most probable modes when neighboring modes are checked and said new combination mode is possible and a syntax element indicates the video blocks neighboring the current video block whose modes are used and how they are used, wherein a mode is added to the list of most probable modes for a subset of possible combinations, and
   wherein a combined mode is added to a list of most probable modes if it is based.

24. An apparatus, comprising
   a memory, and
   a processor, configured to perform:
   predicting a current video block based on a combination of intra prediction modes from video blocks neighboring the current video block; and
   decoding the current video block using said prediction, wherein said combination of intra prediction modes is added to a list of most probable modes used during decoding, wherein a new combination mode is added to the list of most probable modes when neighboring modes are checked and said new combination mode is possible and a syntax element indicates the video blocks neighboring the current video block whose modes are used and how they are used, wherein a mode is added to the list of most probable modes for a subset of possible combinations, and
   wherein a combined mode is added to a list of most probable modes if it is based on directional intra modes with an angle difference of less than 90 degrees. on directional intra modes with an angle difference of less than 90 degrees.

* * * * *